March 23, 1971    G. MELLONE    3,572,183
STRAIGHT DRILL
Filed June 26, 1968
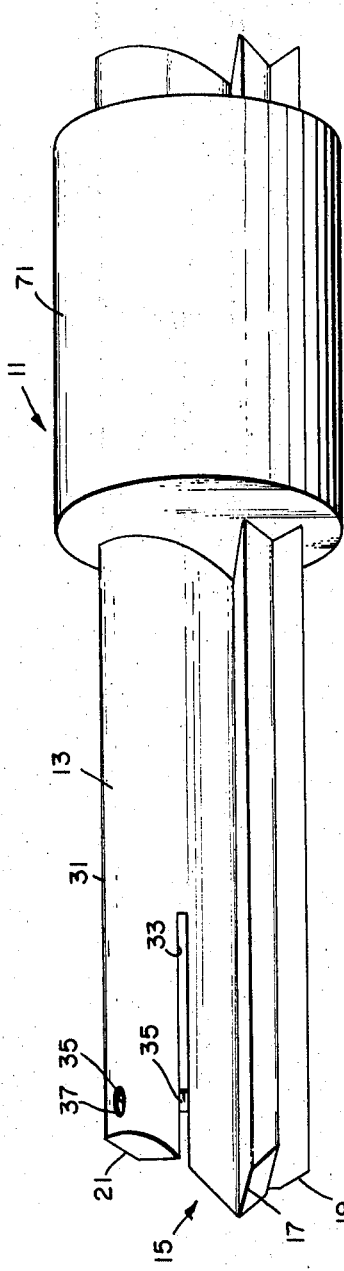
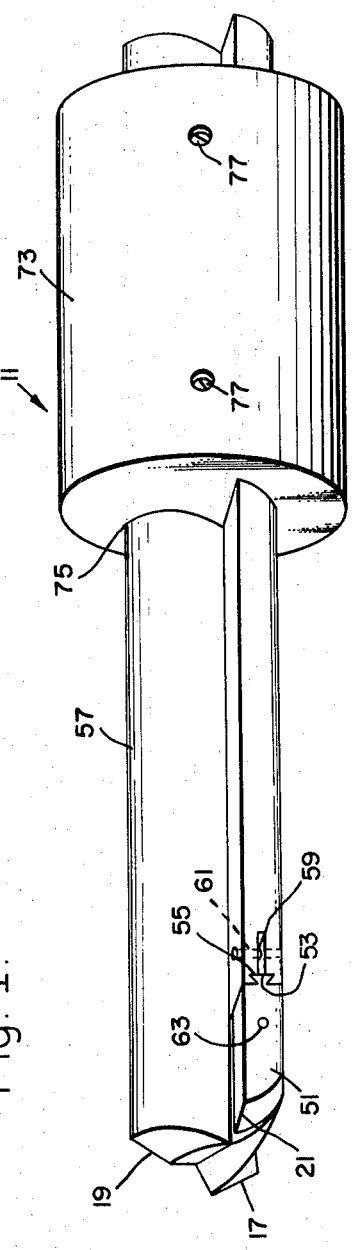
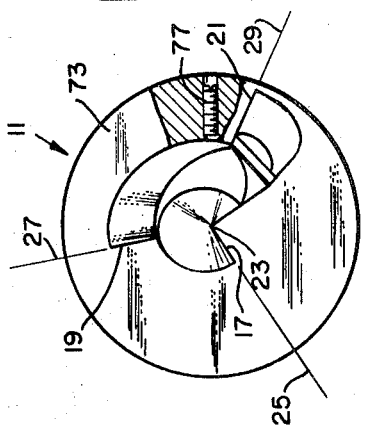
Gennaro Mellone,
INVENTOR.
BY.
ATTORNEY.

United States Patent Office 3,572,183
Patented Mar. 23, 1971

3,572,183
STRAIGHT DRILL
Gennaro Mellone, 3884 Shirley Ave.,
Lynwood, Calif. 90262
Filed June 26, 1968, Ser. No. 740,844
Int. Cl. B23b *51/00*
U.S. Cl. 77—67                                5 Claims

ABSTRACT OF THE DISCLOSURE

A rotary drill for drilling holes in a workpiece whereby equal and balanced cutting pressure is applied by three separate cutting edges disposed at a cutting end of a solid elongated shank member in equally spaced angular directions around the drilling axis, each of the cutting edges being inclined and situated along the same conical rotation surface to generate adjacent annular zones of the conical surface.

---

The present invention relates to a drill bit and more particularly to a rotary drill for drilling holes in a workpiece.

In the past, rotary drills of the type in which chips are cut and removed from the area being drilled are generally classifiable in three main categories. A first, includes rotary drills having a main cutting edge extending from the drill periphery towards the drilling axis, and a secondary, central cutting edge passing through the axis. This configuration commonly results in a deformed hole due to the eccentric force applied by the cutting edges.

Another category includes drills having two symmetrical main cutting edges and a secondary cutting edge in the center which has generally led to a severe problem of chip congestion because of the great amount and large size of the chips generated.

More recently, a third rotary drill configuration was developed using two or more shorter cutting edges situated at the cutting end of a hollow drill shank, which edges are spaced around the cutting periphery. These main cutting edges are generally diametrically opposite each other and inclined and situated along the same conical rotation surface. Further, a secondary cutting edge is provided in the drill center that is inclined in the opposite direction. Although the latter type rotary drill has the advantage of less chip congestion and sideward force, there remains the problem of fabricating a hollow drill shank to clear the chips, and because of the centrally disposed secondary cutting edge being inclined in an opposite direction from the main cutting edge and extending beyond the drilling axis, the drilling pressure of the cutting edges is not balanced and causes a significant amount of undesirable sideward pressure which may cause the hole to be out of round. Also, this type of drill generally requires a rather high degree of skill to center the drill in a relatively small center punch indenture and usually requires that a pilot hole be drilled first. This problem is basically brought about because of the over-center positioning of the center, inversely inclined secondary cutting edge.

It is therefore an object of the present invention to provide a new and improved rotary drill which overcomes the disadvantages of the prior art enumerated above by exerting equal and balanced cutting pressure on the workpiece.

It is another object of the present invention to provide a rotary drill which is easily fabricated from solid shank material in which a hollow core is not required.

It is still another object of the present invention to provide a relatively easy to maintain rotary drill which may include a drill shank that is mounted in a sleeve and which allows the cutting end of the drill shank to be moved along the longitudinal axis of the shank to a desired position relative to the sleeve.

It is yet another object of the present invention to provide a rotary drill having enough clearance at the drill cutting end and along the drill shank to prevent chip congestion, and which will produce a hole free of ring and drill marks.

Another object of this invention is to provide a rotary drill that may be fabricated by an extruding process.

Still another object of the invention is to provide a symmetrically balanced rotary drill with means to change the size of the hole drilled from a single drill bit.

Yet another object of the present invention is to provide a rotary drill which is easily and accurately started even in a relatively small indenture in the workpiece.

According to the present invention, a rotary drill is provided for drilling holes in a workpiece, which drill includes a solid elongated shaft member with a cutting end whereat are disposed three cutting edges extending along radial lines from the longitudinal axis of the shank in three respective directions, approximately 120° apart, each cutting edge being inclined and situated along the same conical rotation surface to generate adjacent annular zones of the conical surface, which zones at least touch each other and extend from the longitudinal drill axis to the periphery of the shank whereby equal and balanced cutting pressure is applied by the cutting edges on the workpiece.

The features of the present invention which are believed to be novel are set forth with particularity in the appended claims. The present invention, both as to its organization and manner of operation, together with further objects and advantages thereof, may best be understood by making reference to the following description, taken in connection with the accompanying drawings in which like reference characters refer to like elements in the several views.

FIG. 1 is a perspective view of a side of one embodiment of the present invention;

FIG. 2 is a perspective view of another embodiment of the invention; and

FIG. 3 is an elevational view of the cutting end of the embodiment of FIG. 2.

Referring again to the drawing, and more particularly to FIG. 1, there is shown a rotary drill 11 having a solid elongated shank member 13 with the cutting end 15 whereat are disposed three cutting edges, namely a central cutting edge 17, a middle cutting edge 19, and an outer cutter edge 21. These cutting edges extend along radial lines from the longitudinal axis 23 of the shank 13 in three respective directions 25, 27 and 29, approximately 120° apart. Each cutting edge 17, 19 and 21, is inclined and situated along the same conical rotation surface to generate adjacent annular zones (not shown) of this conical surface, which zones at least touch each other and extend from the longitudinal axis 23 to the periphery 31 of the shank member 13. This configuration provides equal and balanced cutting pressure by the cutting edges on the workpiece (not shown).

The basic features of the present invention lie in the positioning of the three cutting edges, none of which cross over the rotation axis of the drill, and which cutting edges are all simultaneously in contact with the workpiece material to a significantly equal extent but along three equally spaced angular directions. With all cutting edges similarly inclined and situated along the same conical rotation surface, the drill described may be easily started in a center punched hole with essentially no tendency of the drill to move sidewardly and/or cause an irregular hole cross-section.

The invention may also be provided with means for expanding the drilling area somewhat by forcing the outer cutting edge 21, separated by a milled slot 33 from the remainder of the drill shank 13, by turning a set screw 35 threadably engaged in a threaded hole 37, whereby the set screw 35 forces the portion of the shank containing the outer cutting edge 21 away from the remainer of the shank. This configuration is preferably limited to relatively large drills, capable of practically accepting and utilizing expanding drill bit features and elements as described herein.

Where even a larger hole size change capability is to be provided, an expandable drill bit incorporating the basic features of the present invention may be provided as illustrated in FIGS. 2 and 3. Here, the outer cutting edge 21 is situated on a separate insert 51 having a dovetail portion 53 matching a dovetail clot 55 in a shank member 57. Along the dovetail slot 55 in the shank 57 may be disposed a slot 59 adjustable in its width by the manipulation of a lock bolt arrangement 61 for holding the separate insert 51 in a desired position after it has been positioned thereat by movement of a set screw 63.

The drill shanks of the various embodiments of the invention may be fabricated from any material generally considered appropriate for this particular function, and the cutting edges may be cutting inserts of specially treated or formulated material such as carboloid or high speed steel, for example. Also the shank 13 is shown in FIG. 1 being permanently fixed in a cylindrical sleeve member 71 to allow the drill to be conveniently held in a conventional rotary drill chuck. Furthermore, as seen in FIG. 3, the shank member may be mounted in a sleeve 73 having a longitudinal aperture 75 therein which conforms to the outer peripheral configuration of the shank member. In this way the shank may be moved in either direction along the drill axis to move the cutting end of the shank toward or away from the sleeve member 73 and locked in a desired position by a conventional set screw assembly 77.

From the foregoing it should be evident that the present invention provides a very advantageous rotary drill capable of drilling accurate and true circular holes in a workpiece and which may be economically fabricated from any conventional process including an extruding process.

It should further be clear from the foregoing that the invention is susceptible to numerous modifications and embodiments within the abilities of one having ordinary skill in the art.

I claim:
1. A rotary drill for drilling holes in a workpiece, comprising: a solid elongated shank member with a cutting end whereat are disposed three cutting edges extending along radial lines from the longitudinal axis of said shank in three respective directions approximately 120° apart, each cutting edge being inclined and situated along the same conical rotation surface to generate adjacent annular zones of said conical surface which at least touch each other and extend from said longitudinal axis to the periphery of said shank member, whereby equal and balanced cutting pressure is applied by said cutting edges on said workpiece.

2. A rotary drill according to claim 1, wherein said solid elongated shank member is mounted in a cylindrical sleeve member adapted to be held in a rotary drill chuck.

3. A rotary drill according to claim 2, wherein said solid elongated shank member is slidably mounted in said cylindrical sleeve member which includes a set screw assembly for fixing the position of said cutting end of said shank member relative to said cylindrical sleeve member.

4. A rotary drill according to claim 1, wherein a slot in said cutting end parallel to said longitudinal axis is disposed between a first portion of said elongated shank member containing the outer one of said cutting edges describing the largest annular zone and a second portion comprising the remainder of said elongated shank, said first portion including a set screw arrangement engaging said second portion for adjusting the distance between the outer end of said outer cutting edge and said longitudinal axis.

5. A rotary drill according to claim 1, wherein an outer one of said cutting edges is carried by an insert slidably mounted in said elongated shank member for movement perpendicular to said longitudinal axis, said insert including a set screw arrangement for moving said insert, and said shank including a bolt arrangement for locking said insert in a desired position.

References Cited
UNITED STATES PATENTS

| | | | |
|---|---|---|---|
| 13,998 | 12/1855 | Rollins | 145—127 |
| 834,457 | 10/1906 | Culman | 77—75 |
| 1,165,854 | 12/1915 | Davis | 145—127 |
| 3,274,863 | 9/1966 | Faber | 77—67 |

FRANCIS S. HUSAR, Primary Examiner

U.S. Cl. X.R.

145—127; 77—75